the system while decreasing the system reliability.

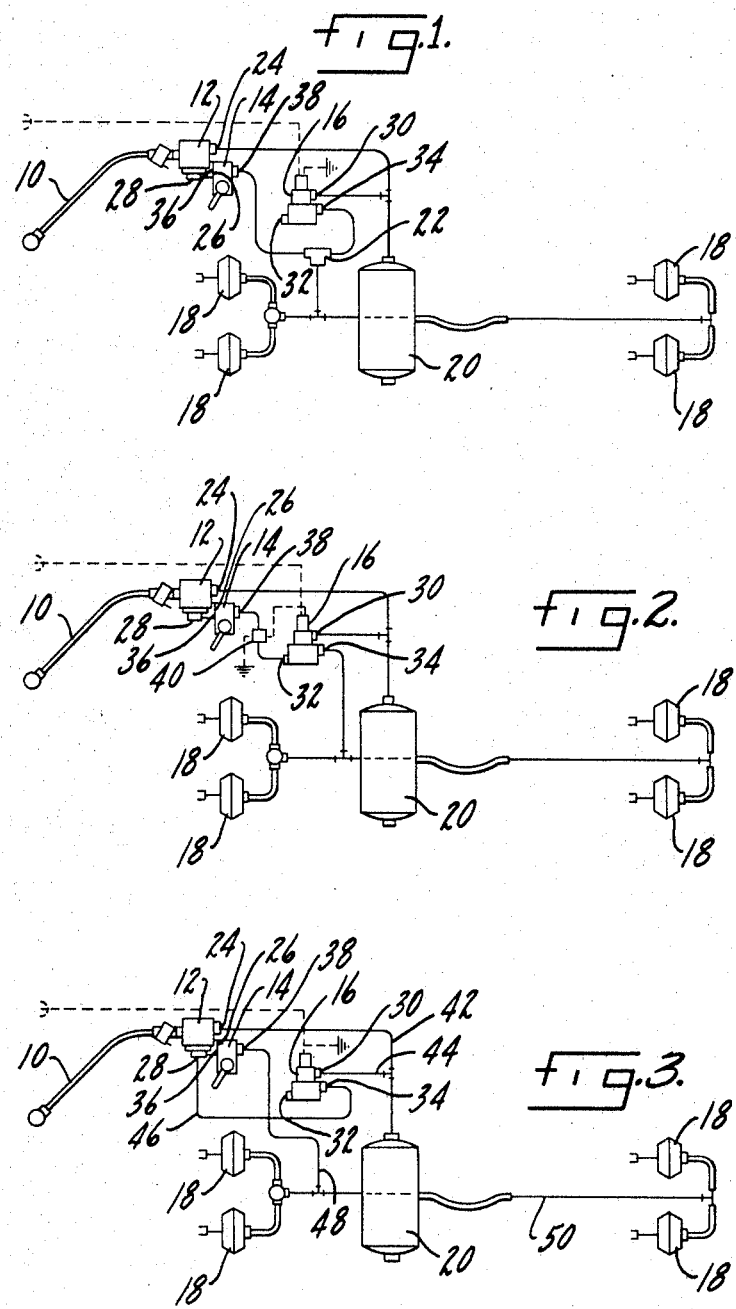

United States Patent Office 3,428,368
Patented Feb. 18, 1969

3,428,368
COMPRESSED AIR BRAKE SYSTEM FOR A TRAILER
Werner Kobnick, Heidelberg, Germany, assignor to Berg Mfg. & Sales Co., a corporation of Illinois
Continuation of application Ser. No. 602,031, Dec. 15, 1966. This application Sept. 8, 1967, Ser. No. 666,314
Claims priority, application Germany, Dec. 17, 1965, B 85,030
U.S. Cl. 303—15    5 Claims
Int. Cl. B60t 7/00, 13/70, 15/14

ABSTRACT OF THE DISCLOSURE

A compressed air brake system to supply either service or permanent braking air pressures to the brake cylinders of a vehicle trailer and having a control valve, a magnetic permanent brake valve, a brake force regulator, and a source of compressed air. The control valve has an inlet connected to the compressed air source, an outlet connected to the brake force regulator, and an air venting connection. The magnetic permanent brake valve has a first inlet connected to the source of compressed air, an outlet connected to the control valve air venting connection, and a second inlet vented to the atmosphere. The brake force regulator outlet is connected to the brake cylinders.

---

This application is a continuation of application Ser. No. 602,031, filed Dec. 15, 1966 and now abandoned.

Background of the invention

This invention resides in the field of compressed air brake systems for motor vehicle trailers and more particularly in compressed air brake systems which enable both service braking and permanent braking.

Generally, a truck or motor vehicle trailer is equipped with service braking and permanent braking. The service braking is actuated by the truck driver pressing down on the brake pedal and may be varied from zero up to a predetermined maximum. The permanent braking is normally actuated by a lever which energizes a magnetic permanent brake valve which then supplies a generally constant permanent braking pressure to the brake cylinders. The permanent braking pressure is generally less than the maximum service brake pressure. The permanent braking may be applied in a variety of situations, one of which is when the truck is rolling down a steep grade. In such a situation, the truck driver might also apply the service brakes. Accordingly, the brake system must be adapted so that the service brakes alone may be applied, so that the permanent brakes alone may be applied, and so that the service brakes and permanent brakes may be applied concurrently. Further, the system must be such that when the brakes are applied concurrently, only the greater of the two braking pressures is delivered to the brake cylinders.

The systems of FIGURES 1 and 2 diagrammatically show prior art systems which ensure that as long as the service braking pressure is lower than the permanent braking pressure, the permanent braking pressure will be applied to the brake cylinders and that as soon as the service braking pressure exceeds the permanent braking pressure, such higher pressure will be applied.

The prior art systems of FIGURES 1 and 2 will be hereinafter described, but, at this point it should be noted that the above is accomplished in the known system of FIGURE 1 by the two-way check valve 22 and by the pneumatic switch 40 in the known system of FIGURE 2. The use of such components, however, increase the system cost, complexity, and the reaction or threshold time of the system while decreasing the system reliability.

In the braking system of this invention, the above is accomplished utilizing the standard components used in such prior art systems but without either the two-way check valve 22 or the pneumatic switch 40 and with fewer connections. Accordingly, the braking system of this invention is greatly simplified, more economical, more reliable, and has a lower threshold or reaction time than such prior art systems.

Summary of the invention

This invention relates to a compressed air brake system and more particularly to a compressed air brake system which enables either service or permanent braking of a motor vehicle trailer and which delivers only the greater of the service braking pressure and the permanent braking pressure to the brake cylinders when the service brakes and permanent brakes are operated simultaneously.

Therefore, a primary object of this invention is to provide a compressed air brake system for a vehicle trailer which is adapted to deliver the greater of either the service or permanent braking pressure to the brake cylinders.

Another object of this invention is to provide a brake system as above described which is economical and which has an improved braking reaction or threshold time.

A further object of this invention is to provide a brake system as above described which does not require a two-way check valve, a pneumatic switch, or other like components.

Other objects and advantages of the invention will become apparent upon reading the following description of the invention.

Brief description of the drawings

The invention is illustrated more or less diagrammatically in the accompanying drawings wherein:
FIGURE 1 is a schematic diagram of a known prior art compressed air brake system for a vehicle trailer;
FIGURE 2 is a schematic diagram of another known prior art compressed air brake system for a vehicle trailer; and
FIGURE 3 is a schematic diagram of the compressed air brake system of this invention.

Description of the preferred embodiment

Like reference numerals will be used to refer to like parts throughout the following description of the drawings.

Referring now to FIGURE 1, a known prior art compressed air brake system for a vehicle or truck trailer has been shown which comprises a trailer conduit 10, a trailer control valve 12 which may be of the type shown in U.S. Patent 3,181,917, a brake force regulator 14, a magnetic permanent brake valve 16, brake cylinders 18, a supply vessel or source of compressed air 20, a two-way check valve 22, and suitable connecting conduits. The structural details and operation of the above mentioned components are well known to those skilled in the art and, therefore, will not be described in detail.

Generally, however, the control valve 12 has an inlet 24, an outlet 26, and an air venting connection 28 and is adapted to supply through its outlet 26 a variable service braking pressure to the brake cylinders 18 in response to inputs from the service brake pedal through the trailer conduit 10.

Generally, the magnetic permanent brake valve 16 has an inlet 30, a port 32, and an outlet 34. The port 32 communicates with a weigh piston located internally of the valve 16. The valve 16 is provided with a solenoid and valve means adapted to deliver permanent braking air pressure at outlet 34 when the solenoid is energized. This permanent braking air pressure is predetermined at a value somewhat less than the maximum deliverable through valve 12 when the latter is actuated.

The brake force regulator 14 is of the well-known type adapted to regulate the braking air pressure and therefore the braking force to the load carried by the trailer.

In the system of FIGURE 1, the inlets 24 and 30 of the control valve 12 and the magnetic permanent brake valve 16 are connected to the source of compressed air 20. The outlet 26 of the control valve 12 is connected to an inlet 36 on the brake force regulator 14. The outlet 34 of the magnetic permanent brake valve 16 is shown connected to one side of the check valve 22 while the port 32 is vented to the atmosphere. The other side of the check valve 22 is connected to an outlet 38 on the brake force regulator 14. Accordingly, service braking pressure is delivered to one side of the two-way check valve 22 and permanent braking pressure is delivered to the other side.

The two-way check valve 22 is adapted to deliver the greater of either the service braking pressure from the control valve 12 or the permanent braking pressure from the magnetic permanent brake valve 16 to the brake cylinders 18 while blocking the lesser braking pressure.

Referring now to FIGURE 2, another well-known compressed air brake system has been shown which utilizes the same basic components used in the system of FIGURE 1, with the exception that the system of FIGURE 2 utilizes a pneumatic switch 40 in place of the two-way valve 22 of FIGURE 1. In the system of FIGURE 2, the brake force regulator 14 is connected to the magnetic permanent brake valve port 32 through the pneumatic switch 40 and the magnetic permanent brake valve outlet 34 is connected to the brake cylinders 18. The pneumatic switch 40 has its switch contacts connected in the energizing circuit of the magnetic permanent brake valve solenoid and is adjusted so that when the service braking pressure is approximately equal to the permanent braking pressure, the magnetic permanent brake valve 16 is de-energized and the service brake pressure is delivered to outlet 34 and hence the brake cylinders 18. As will be understood by those skilled in the art, the switch 40 is required since the conventional permanent brake valve 16 is such that the brake cylinders would otherwise receive an additive service and permanent brake pressure.

The air brake system of this invention has been shown in FIGURE 3 as comprising the trailer control valve 12, the brake force regulator 14, the magnetic permanent brake valve 16, the trailer supply vessel 20, and the brake cylinders 18. The above mentioned components are the same as those used in the systems of FIGURES 1 and 2, and, as mentioned above, are well known to those skilled in the art.

In the air brake system of FIGURE 3, the above mentioned components are connected in such a way that when service braking and permanent braking are applied simultaneously, only the greater of the two pressures is delivered to the brake cylinders 18. It should be noted that in the system of FIGURE 3, delivery of the greater of the two pressures is accomplished without the necessity of an additional component such as the two-way check valve 22 of the system of FIGURE 1 or the pneumatic switch 40 of the system of FIGURE 2.

As shown in FIGURE 3, the inlets 24 and 30 of the trailer control valve 12 and the magnetic permanent brake valve 16 are connected to the trailer supply vessel or source of compressed air 20 by suitable conduits 42 and 44. The outlet 34 of the magnetic permanent brake valve 16 is connected to the air venting connection 28 of the control valve 12 by a suitable conduit 46. The port 32 of the magnetic permanent brake valve 16 is vented to the atmosphere. The outlet 26 of the control valve 12 is connected to the brake force regulator inlet 36. The outlet 38 of the brake force regulator 14 is connected to the brake cylinders 18 by suitable conduits 48 and 50.

Accordingly, when only the service brakes are being used, service braking pressure is delivered from the trailer supply vessel 20 to the brake cylinders 18 through conduit 42, trailer control valve 12, brake force regulator 14, conduit 48, and conduit 50. The amount of service braking pressure applied to the cylinders 18 is controlled by the brake pedal through trailer conduit 10. When the permanent brakes are actuated by energizing the solenoid of the magnetic permanent brake valve 16, permanent braking pressure is applied to the brake cylinders 18 from the trailer supply vessel 20 through conduit 44, the permanent brake valve 16, conduit 46, the trailer control valve 12, brake force regulator 14, conduit 48, and conduit 50.

When both service braking and permanent braking are supplied simultaneously, only the greater of the two pressures will be delivered to the braking cylinders 18. In such a case, the permanent brake pressure would be supplied to the brake cylinders 18 until such time as the service brake pressure exceeds the permanent brake pressure. When this occurs, service brake pressure is applied to the brake cylinders 18.

Since the system of FIGURE 3 does not require the use of a two-way check valve 22, as in the system of FIGURE 1, a pneumatic switch 16, as in the system of FIGURE 2, or other like components, the system reaction or threshold time is improved while reducing the system cost and complexity.

Although the system of this invention has been shown in FIGURE 3 as including a brake force regulator 14 interposed between the valve outlet 26 and the brake cylinders 18, it will be understood by those skilled in the art that the regulator 14 may be eliminated and conduit 48 connected directly to the outlet 26.

I claim:

1. In a vehicle air brake system, a source of pressure, a set of brake operating cylinders, a control valve operable to deliver a variable pressure from said source of pressure to said cylinders, a solenoid operated valve adapted to deliver a generally constant pressure from said source of pressure through said control valve to said cylinders, whereby, only the greater of said variable pressure and said constant pressure is delivered to said cylinders.

2. In a braking system for a motor vehicle trailer and of the type adapted to supply a variable service braking pressure and a generally constant permanent braking pressure to the braking cylinders of the trailer, with said system including a source of pressure; trailer control valve means for establishing said service braking pressure and having an inlet in communication with said source of pressure, an outlet, and an air venting connection; permanent brake valve means for establishing said permanent braking pressure and having a first inlet communicating with said source of pressure, and an outlet; the improvement comprising:

said outlet of said permanent brake valve means communicating with said trailer control valve means through said air venting connection, and said outlet of said trailer control valve means communicating with said trailer brake cylinders.

3. The improved braking system of claim 2 further characterized by and including brake force regulator means for regulating the braking pressure to the load carried by the trailer, said brake force regulator means interposed between said outlet of said trailer control valve means and said trailer brake cylinders.

4. A braking system for a motor vehicle trailer for supplying a variable braking pressure and a generally constant braking pressure to the trailer brake cylinders, said system including, in combination, a source of pressure, permanent brake valve means for establishing said generally constant braking pressure, said permanent brake valve means having a first inlet communicating with said source of pressure, a second inlet vented to the atmosphere, and an outlet, with said constant braking pressure being effective at said outlet, trailer control valve means for establishing said variable braking pressure, said trailer control valve having an inlet communicating with said source of pressure, an outlet, and an air venting connection, with said variable braking pressure being effective at said outlet of said control valve means, with said outlet of said permanent brake valve means communicating with said air venting connection of said control valve means and said outlet of said control valve means communicating with said trailer brake cylinders.

5. The braking system of claim 4 further characterized by and including brake force regulator means for regulating the braking pressure to the load carried by the trailer, said brake force regulator means interposed between said outlet of said control valve means and said trailer brake cylinders.

References Cited
UNITED STATES PATENTS 3,240,534    3/1966    Stelzer    303—15
3,068,050    12/1962    Pekrul    303—28

MILTON BUCHLER, *Primary Examiner.*

J. J. McLAUGHLIN, *Assistant Examiner.*

U.S. Cl. X.R

303—3, 7, 8, 20, 40